US009529764B1

(12) United States Patent
Burton et al.

(10) Patent No.: US 9,529,764 B1
(45) Date of Patent: Dec. 27, 2016

(54) NEAR-TO-EYE DISPLAY HOT SHOE COMMUNICATION LINE

(71) Applicant: Exelis Inc., McLean, VA (US)

(72) Inventors: Thomas D. Burton, Christiansburg, VA (US); David B. Kaplan, Vinton, VA (US)

(73) Assignee: Exelis, Inc., McLean, VA (US)

( * ) Notice: Subject to any disclaimer, the term of this patent is extended or adjusted under 35 U.S.C. 154(b) by 497 days.

(21) Appl. No.: 14/065,870

(22) Filed: Oct. 29, 2013

(51) Int. Cl.
*G06F 13/42* (2006.01)
*G06F 9/44* (2006.01)

(52) U.S. Cl.
CPC .............. *G06F 13/42* (2013.01); *G06F 9/4401* (2013.01)

(58) Field of Classification Search
USPC ................. 710/100; 2/6.2–6.3, 422; 345/156
See application file for complete search history.

(56) References Cited

U.S. PATENT DOCUMENTS

| | | | | |
|---|---|---|---|---|
| 5,153,580 A * | 10/1992 | Pollack | G04G 15/006 | 340/12.22 |
| 5,289,217 A * | 2/1994 | Rosenblatt | G03B 17/00 | 396/281 |
| 5,331,684 A * | 7/1994 | Baril | A42B 3/04 | 2/422 |
| 5,535,053 A * | 7/1996 | Baril | G02B 23/125 | 250/214 VT |
| 5,683,831 A * | 11/1997 | Baril | A42B 3/0406 | 429/100 |
| 5,812,878 A * | 9/1998 | Christiansen | G06F 13/28 | 710/22 |
| 5,812,881 A * | 9/1998 | Ku | G06F 13/4045 | 710/2 |
| 6,288,386 B1 * | 9/2001 | Bowen | G02B 23/12 | 250/214 VT |
| 6,336,155 B1 * | 1/2002 | Ito | G06F 3/1293 | 710/36 |
| 6,662,370 B1 * | 12/2003 | Buchanan, Jr. | A42B 3/04 | 2/422 |
| 7,089,426 B1 * | 8/2006 | Bagshaw | G06F 21/84 | 380/200 |
| 7,740,499 B1 * | 6/2010 | Willey | H01R 13/625 | 439/289 |
| 8,606,946 B2 * | 12/2013 | Anderson | H04L 12/6418 | 709/230 |

(Continued)

*Primary Examiner* — Paul R Myers
(74) *Attorney, Agent, or Firm* — Edell, Shapiro & Finnan LLC

(57) ABSTRACT

Provided is an apparatus which includes a near-to-eye display, a microcontroller, a hot shoe interface with an external port configured to communicate with an external mounting device for the near-to-eye-display, a hot shoe interface line between the external port and the microcontroller, and a communication line between the external port and the microcontroller. The communication line is configured to share at least a portion of the hot shoe interface line, and is also configured to transmit and receive external communications through the external port. The microcontroller is configured to activate and inactivate transmission over the communication line in response to predetermined signals received over the communication line within a first predetermined time period of at least one of the near-to-eye display being powered-on or the mounting device transitioning from one of an active orientation or a stowed orientation to the other.

18 Claims, 11 Drawing Sheets

(56) References Cited

U.S. PATENT DOCUMENTS

| | | | | |
|---|---|---|---|---|
| 8,719,334 B2* | 5/2014 | Anderson | ......... | H04L 29/06027 |
| | | | | 709/203 |
| 8,862,913 B2* | 10/2014 | Aldridge | .................. | H02N 2/18 |
| | | | | 713/300 |
| 2005/0135390 A1* | 6/2005 | Anderson | ........... | H04L 12/6418 |
| | | | | 370/401 |
| 2008/0027590 A1* | 1/2008 | Phillips | ................ | G05D 1/0088 |
| | | | | 701/2 |
| 2008/0136916 A1* | 6/2008 | Wolff | ...................... | G06F 3/012 |
| | | | | 348/169 |
| 2008/0218505 A1* | 9/2008 | Choi | ........................ | G06F 3/14 |
| | | | | 345/212 |
| 2011/0072562 A1* | 3/2011 | Prendergast | ............. | A42B 3/04 |
| | | | | 2/422 |
| 2012/0068921 A1* | 3/2012 | Jacobsen | ................. | G06F 3/012 |
| | | | | 345/156 |
| 2014/0191964 A1* | 7/2014 | McDonald | ............. | G06F 3/011 |
| | | | | 345/158 |

\* cited by examiner

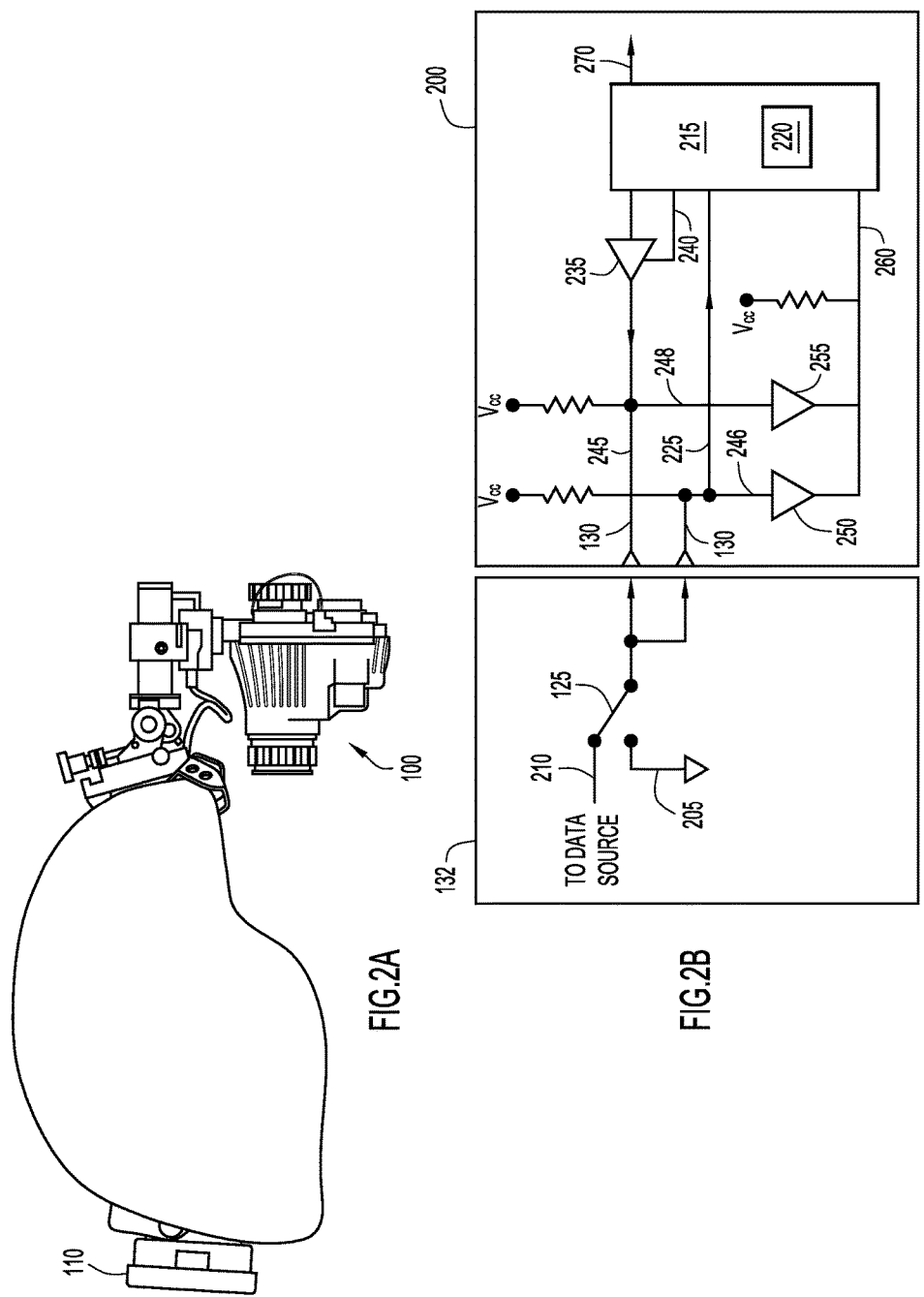

NEAR-TO-EYE DISPLAY HOT SHOE COMMUNICATION LINE

TECHNICAL FIELD

The present disclosure relates near-to-eye displays, and in particular, external communication with near-to-eye displays.

BACKGROUND

Near-to-eye displays, such as night vision goggles and altered reality goggles, require maintenance ports for software installation, software updates, configuration, and testing. The maintenance port provides communication between the near-to-eye display and an external computing device which is running maintenance software. When the maintenance port is a wired port, such as Universal Serial Bus (USB) port, the port should be easily accessible so that software can be easily updated. This means that the port should be accessible to a fully assembled device. For a night vision goggle which is designed to withstand harsh environment, providing an external port requires providing access to the port through the external cover of the night vision goggle. Furthermore, the port itself must be robust in order to withstand the harsh environments in which the night vision goggle is designed to operate.

Adding additional wired ports to a near-to-eye display incurs additional manufacturing cost, including but not limited to the cost of the port itself. For example, the port will need to be provided with electro-magnetic interference (EMI) and environmental shielding. If a wireless port is utilized, an antenna must be chosen which is capable of penetrating the EMI shielding of the near-to-eye display.

Near-to-eye displays may be equipped with a hot shoe connection. The hot shoe connection may be configured to provide a near-to-eye display with power and grounding, as well as control signals. For example, a hot shoe connection may connect a night vision goggle to a mounting device. Signals received through the hot shoe connection may indicate to the night vision goggle whether or not the mounting device is in an active or stowed position.

BRIEF DESCRIPTION OF THE DRAWINGS

FIGS. 2a and 2b are illustrations of an example near-to-eye display and a corresponding circuit diagram when the near-to-eye display is powered-up in an active position.

DESCRIPTION OF EXAMPLE EMBODIMENTS

Overview

Provided is an apparatus which includes a near-to-eye display, a microcontroller, a hot shoe interface with an external port configured to communicate with an external mounting device for the near-to-eye-display, a hot shoe interface line between the external port and the microcontroller, and a communication line between the external port and the microcontroller. The communication line is configured to share at least a portion of the hot shoe interface line, and is also configured to transmit and receive external communications through the external port. The microcontroller is configured to activate and inactivate transmission over the communication line in response to a predetermined signal and/or signals received over the communication line. According to one examples, the microcontroller may wait a first predetermined time period after at least one of the near-to-eye display being powered-on or the mounting device transitioning from one of an active orientation or a stowed orientation to the other to see if the predetermined signal or signals are received. According to other examples, the microcontroller may activate or inactivate transmission line based on the signal or signals received immediately upon being powered-on or the mounting device transitioning from one of an active orientation or a stowed orientation to the other.

Example Embodiments

In order to provide a maintenance port without including an additional interface, the following examples describe a near-to-eye display which utilizes a hot shoe interface as both a stow indicator and a communication port. By monitoring the input to a microcontroller from the hot shoe interface the microcontroller can appropriately configure the hot shoe interface and the microcontroller input/output pins to operate as either the stow indicator or the maintenance communication port.

Figure 1A:
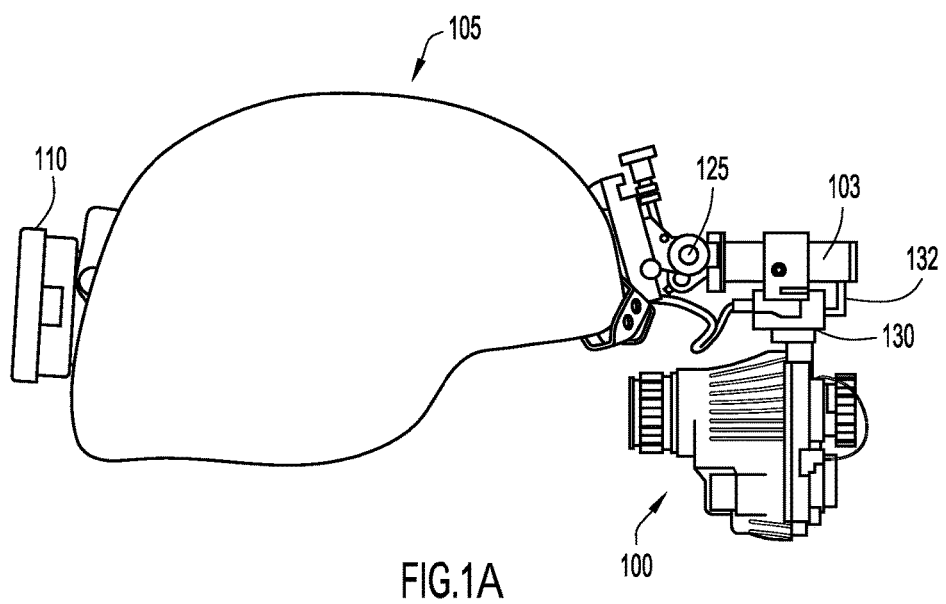
FIGS. 1a, 1b, and 1c are illustrations of multiple example views of a near-to-eye display.
Figure 1B:
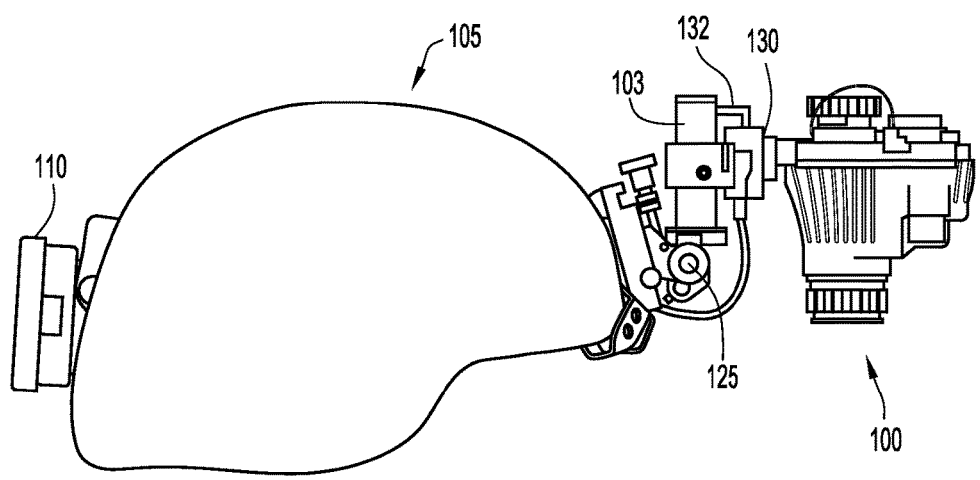
Figure 1C:
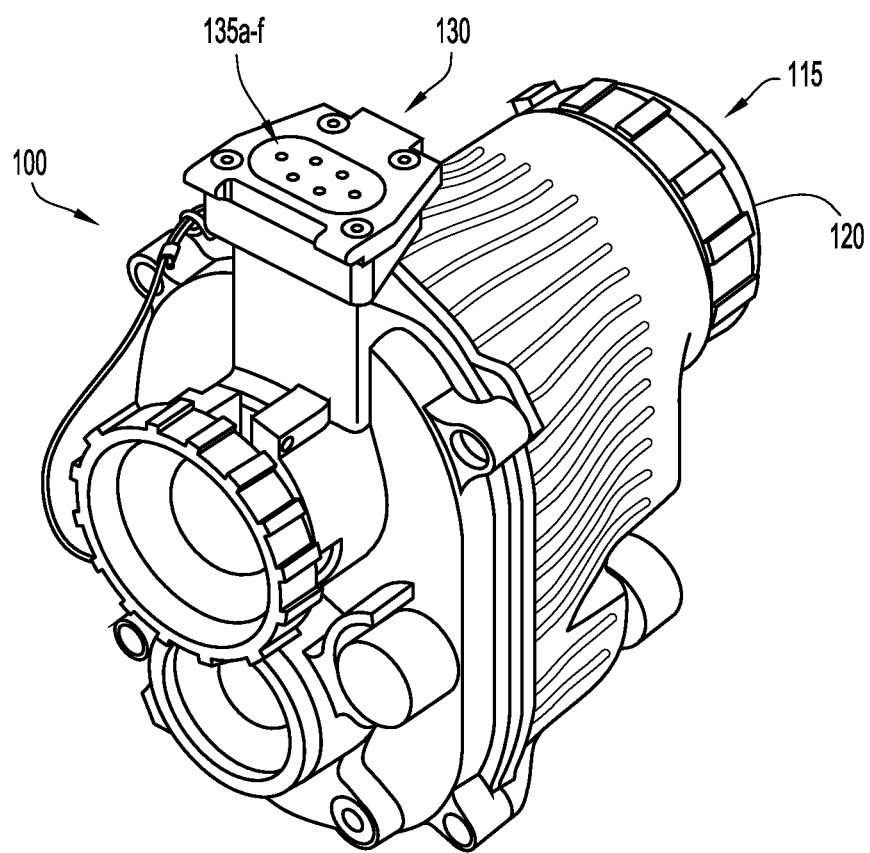

Depicted in FIG. 1a is an active position for near-to-eye display, and a night vision goggle 100 in particular. Night vision goggle 100 is mounted via mounting device 103 on helmet 105. FIG. 1b is a stowed position view of night vision goggle 100, while FIG. 1c is a perspective view of the night vision goggle 100. When operating as a viewing device in a low light environment, night vision goggle 100 will be positioned on mounting device 103 of helmet 105 in an active position as illustrated in FIG. 1a, but if the user does not wish to have an enhanced image of the environment, mounting device 103 allows night vision goggle 100 to be "flipped up" or stowed as illustrated in FIG. 1b. When in the stowed position of FIG. 1b, night vision goggle 100 may be placed into an "off" or "standby mode" in order to save energy in power supply 110. Similarly, it may be desirable for display 115 to be turned off in the stowed position so that light emitted from display 115 does not escape from eye piece 120 and thereby alert others to the presence of the user of night vision goggle 100. In order to implement the standby or off mode, stow switch 125 communicates to hot shoe interface 130 of night vision goggle 100 through hot shoe 132.

Figure 3:
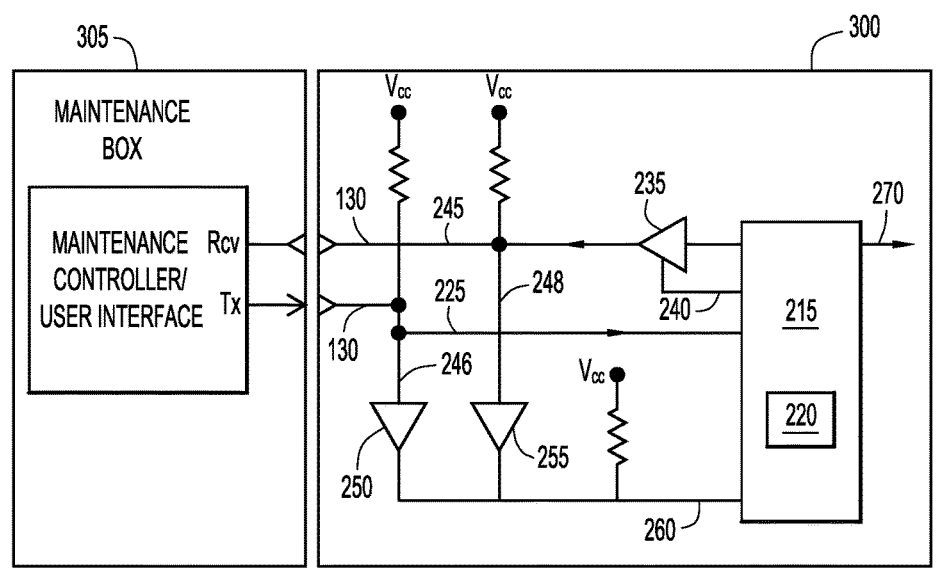
FIG. 3 is an illustration of a circuit diagram of a near-to-eye display that is connected to a maintenance harness when powered-up.

Specifically, upon transitioning from the active position of FIG. 1a to the stowed position of FIG. 1b, night vision goggle 100 is configured to connect hot shoe interface 130 to electrical ground. For example, one or more of electrical connections 135a-f of FIG. 1c may be electrical connected to corresponding connections in hot shoe 132. The transition of the night vision goggle 100 from the active position to the stowed position will cause stow switch 125 to electrically connect at least one of connections 135a-f to ground. A particular example of this transition will be illustrated in more detail with reference to FIGS. 2-4 below.

In addition to transitioning from an active state to a stowed state, night vision goggle 100 may also be configured to transition night vision goggle 100 from an active low light display mode to another active mode. For example, when a night vision goggle such as goggle 100 is being tested after final assembly, the goggle may be placed into a maintenance mode which allows a technician to initiate maintenance tests. Similarly, after final assembly, night vision goggle 100 may be placed into a maintenance mode to, for example, update the software running on goggle 100. At other times, night vision goggle 100 may be placed into other modes which allow goggle 100 to receive a video signal through hot shoe interface 130. For example, during training exercises, night vision goggle 100 may be placed into a training mode in which a number of predetermined images are displayed on display 115 according to a signal received through hot shoe interface 130. At other times, night vision goggle 100 may be placed in a mode which allows for external signals to be received through hot shoe interface 130 and subsequently combined with an enhanced image being displayed on display 115.

With reference now made to FIGS. 2a-b, depicted therein is a circuit diagram 200 for one example night vision goggle 100 in which hot shoe interface 130 is configured to serve as a communication port. As illustrated in FIG. 2a, night vision goggle is powered-up in an active position. Accordingly, stow switch 125 is initially not connected to ground 205, and instead, stow switch 125 is connected to data source 210. According to other examples, stow switch 125 may be embodied a in double-pole switch to provide separate connections for receive line 225 and transmit line 245. Upon powering-up, microcontroller 215 and communication port logic 220 cause goggle 100 to wait predetermined length of time after power-up for a predetermined signal to be received over receive line 225. According to some examples, the predetermined signal may comprise a "logical high" signal. According to other examples, the predetermined signal may comprise a sequence of digital or analog signals.

Upon receiving the predetermined signal, microcontroller 215 will initiate communication through hot shoe interface 130. According to the example of FIGS. 2a-b, microcontroller 215 will enable tri-statable buffer 235 by sending a logically "high" signal over connection 240. Once tri-statable buffer 235 is enabled, connection 245 may serve as a transmission line so that microcontroller 215 can send signals through hot show 132 to data source 210. Furthermore, if stow switch 125 is embodied in as a double-pole switch, bi-directional data transmission may be provided over receive line 225 and transmit line 245.

Communication port logic 220 may be embodied in, for example, hardware or software. According to one example, microcontroller 215 may be embodied in a field-programmable gate array in which communication port logic 220 is incorporated into the hard programming of the gate array. According to another example, microcontroller 215 may be embodied in a general purpose microprocessor, and communication port logic 220 is embodied in software instructions that when executed by microcontroller 215, cause microcontroller 215 to carry out the process described above to activate transmission line 245.

As also illustrated in FIG. 2, at least a portion of transmit line 245 and receive line 225 are shared with a pair of redundant stow signal lines 246 and 248. Specifically, first stow signal line 246 shares the same hot-shoe connecter as receive line 225, while second stow signal line 248 shares the same hot shoe connector as transmit line 245. First stow signal line is connected to open collector 250, while second stow signal line 248 is connected to open collector 255. To allow first stow line 246 and second stow line 248 to serve as independent and redundant stow lines, the outputs of open collectors 250 and 255 are physically connected to a pin of microcontroller 215 through stow input 260. Open collector 250 and open collector 255 serve as a "wired AND" such that stow input 260 is only in a logically high state when the input to both open collector 250 and open collector 255 are high. As microcontroller 215 is configured to read a low logical value as an indication that night vision goggle 100 is in a stowed position, first stow line 246 and second stow line 248 are independent and redundant. Specifically, a stow signal from either of first stow signal line 246 or second stow signal line 248, regardless of the value of the other stow signal line, will cause the microcontroller to receive a signal indicating that the night vision goggle 100 is in the stowed position.

Once transmit line 245 is activated, microcontroller 215 may send a signal to data source 210 indicating that it is prepared to receive additional data. Accordingly, data source 210 may begin sending video data through hot shoe 132 to hot shoe interface 130. According to other examples, data source 210 may begin sending a software update to microcontroller 215 over receive line 225. According to yet another example, data source 210 may send data such as global positioning data to microcontroller 215 which microcontroller 215 may use to provide an augmented reality display to the user of night vision goggle 100 through display output 270.

Microcontroller 215 may also be configured to subsequently disable transmission line 245. For example, microcontroller 215 may receive a predetermined signal over receive line 225 which indicates that data source 210 does not have any additional data to send. Upon receipt of this predetermined signal, microcontroller 215 may deactivate transmission line 245 by no longer sending a signal to tri-statable buffer 235 over connection 240. According to another example, night vision goggle 100 may be placed into the stowed position, thereby switching switch 125 from data source 210 to ground 205. Once switch 125 is connected to ground, one or both of first stow signal line 246 and second stow signal line 248 will be in the a low logical state. Accordingly, the wired AND created by open collectors 250 and 255 will cause stow input 260 to be in the low logical state, indicating to microcontroller 215 that night vision goggle 100 is in the stowed position. In response to goggle 100 being placed in the stowed position, microcontroller 215 may disable transmission line 245 by no longer sending a signal to tri-statable buffer 235 over connection 240. Similarly, microcontroller 215 may disable the display of night vision goggle 100 through display output 270. Accordingly to other examples, microcontroller 215 may be configured to maintain transmit line 245 in an active state until night vision goggle is powered-off or reset regardless of the position of switch 125.

If, on the other hand, communication port logic 220 causes microcontroller 215 to wait a predetermined length of time after powering-up and no predetermined signal is received over receive line 225, microcontroller 215 places the night vision goggle in a default mode of operation. For example, if the default mode of operation is providing enhanced images of a low-light environment, night vision goggle 100 will enter this mode.

Additionally, while the example of FIGS. 2a and 2b is described as taking place upon powering-up of night vision goggle 100, a similar process may take place when the night vision goggle is reset or the first time night vision goggle 100 is transitioned from the stowed position to the active position. For example, the first time night vision goggle 100 enters the active position, microcontroller 215 at the direction of communication port logic 220 may wait a predetermined length of time for a predetermined signal to be received over receive line 225. Because microcontroller 215 is monitoring a transition from a stowed state to an active state, the predetermined length of time may be shorter than the predetermined length of time that microcontroller 215 would wait after an initial powering-up of night vision goggle 100.

With reference now made to FIGS. 3a and 3b, depicted therein is night vision goggle 100 which is powered-up in a maintenance harness 305, as opposed to a hot shoe, such as hot shoe 132 of FIGS. 1 and 2. Upon powering-up, communication port logic 220 causes goggle 100 to wait a predetermined length of time after power-up for a predetermined signal to be received over receive line 225. According to another example, microcontroller 300 may read the signal received over receive line 225 immediately after power-up.

Upon receiving the predetermined signal, microcontroller 215 will initiate communication through hot shoe interface 130. According to the example of FIG. 3, microcontroller 215 will enable tri-statable buffer 235 by sending a logically "high" signal over connection 240. Once tri-statable buffer 235 is enabled, connection 245 may serve as a transmission line so that microcontroller 215 can send signals back to data source 210.

If, on the other hand, communication port logic 200 causes microcontroller 215 to wait a predetermined length of time after powering-up and no predetermined signal is received over receive line 225, microcontroller 215 places the night vision goggle in a default mode of operation. For example, if the default mode of operation is providing enhanced images of a low-light environment, night vision goggle 100 will enter this mode.

Once transmit line 245 is activated, microcontroller 215 may send a signal to maintenance box 305 indicating that it is prepared to receive additional data. Accordingly, maintenance box 305 may begin sending maintenance data through hot shoe interface 130 over receive line 225. For example, the maintenance data may include a software update for microcontroller 215. According to another example, the maintenance data may include diagnostic tests to be performed on night vision goggle 100.

Subsequent to microcontroller 215 activating transmission line 245, microcontroller 215 may subsequently disable transmission line 245. For example, microcontroller 215 may receive a predetermined signal over receive line 225 which indicates that maintenance box 305 does not have any more data to send. Upon receipt of this predetermined signal, microcontroller 215 may deactivate transmission line 245 by no longer sending a signal to tri-statable buffer 235 over connection 240. According to another example, night vision goggle 100 may be prematurely disconnected from maintenance box 305. Upon disconnection, microcontroller may wait a predetermined length of time to determine whether or not goggle 100 will be reconnected to maintenance box 305. If a signal is received over receive line 225 within the time period, microcontroller 215 may continue in maintenance mode. On the other hand, microcontroller 215 may exit maintenance mode and begin operating in a default mode of operation if no subsequent signals are received. Microcontroller 215 may also log an error message to indicate that goggle 100 was disconnected from maintenance box 305 prior to conclusion of the maintenance operation being carried out.

Figure 4A:
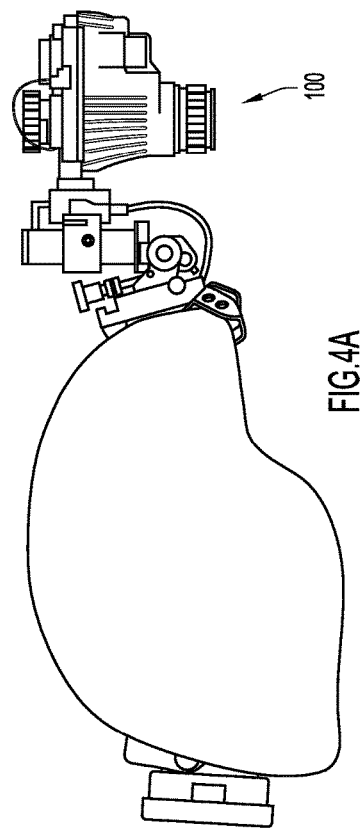
FIGS. 4a and 4b are illustrations of an example near-to-eye display and a corresponding circuit diagram when the near-to-eye display is powered-up in a stowed position.
Figure 4B:
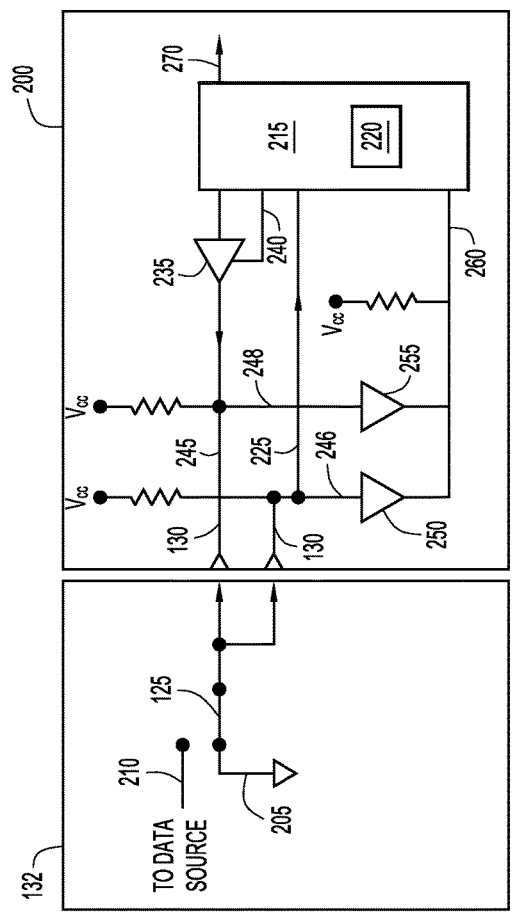

With reference now made to FIGS. 4a and 4b, depicted therein is a third example night vision goggle 100 in which the goggle has been powered-on in a stowed position as illustrated in FIG. 4a. When powered-on the stowed position, switch 125 connects hot shoe interface 130 to ground 205. Microcontroller 215 will immediately register a logical "low" through stow input 260 due to the connection to ground 205. Communication port logic 220 of microcontroller 215 will register the "low" signal such that when night vision goggle 100 is toggled to the active position, goggle 100 will immediately enter the "active" normal operating mode. For example, night vision goggle 100 may immediately begin providing a light enhanced view of the user's environment. In other words, powering-on night vision goggle 100 in the stowed position provides the user with a way of by-passing the predetermined time period described above with reference to FIGS. 1-3. For example, night vision goggle 100 may be used in a hostile environment, such as a battlefield. The user may not have time to wait the predetermined period of time described above with reference to FIGS. 1-3. Accordingly, by powering-up goggle 100 in the stowed position, the initial ground signal will tell microcontroller 215 to by-pass the predetermined time period once the goggle is toggled to the active position.

According to other examples, communication port logic 220 may cause night vision goggle to wait a second predetermined period of time to see if the night vision goggle is transitioned from the stowed position to the active position. For example, a user may power-up night vision goggle in the stowed position even though they will be subsequently using night vision goggle 100 in a maintenance mode. Therefore, communication port logic may be configured to wait a predetermined period of time to allow the user to transition night vision goggle from the stowed position to the active position. This predetermined period of time may be significantly less than the time period communication logic 220 waits to receive signals over receive line 225 when goggle 100 is powered-up in the active position. For example, if communication port logic 220 waits ten seconds after an initial power-up in the active position, communication port logic 220 may wait one second for goggle 100 to be transitioned from the stowed position to the active position after power-up in the stowed position. If goggle 100 is transitioned from the stowed position to the active position within this shorter predetermined period of time, communication port logic 220 may then cause goggle 100 to wait the longer predetermined period for predetermined signals to be received over receive line 225 as described above with reference to FIG. 2.

Figures 5A, 5B:
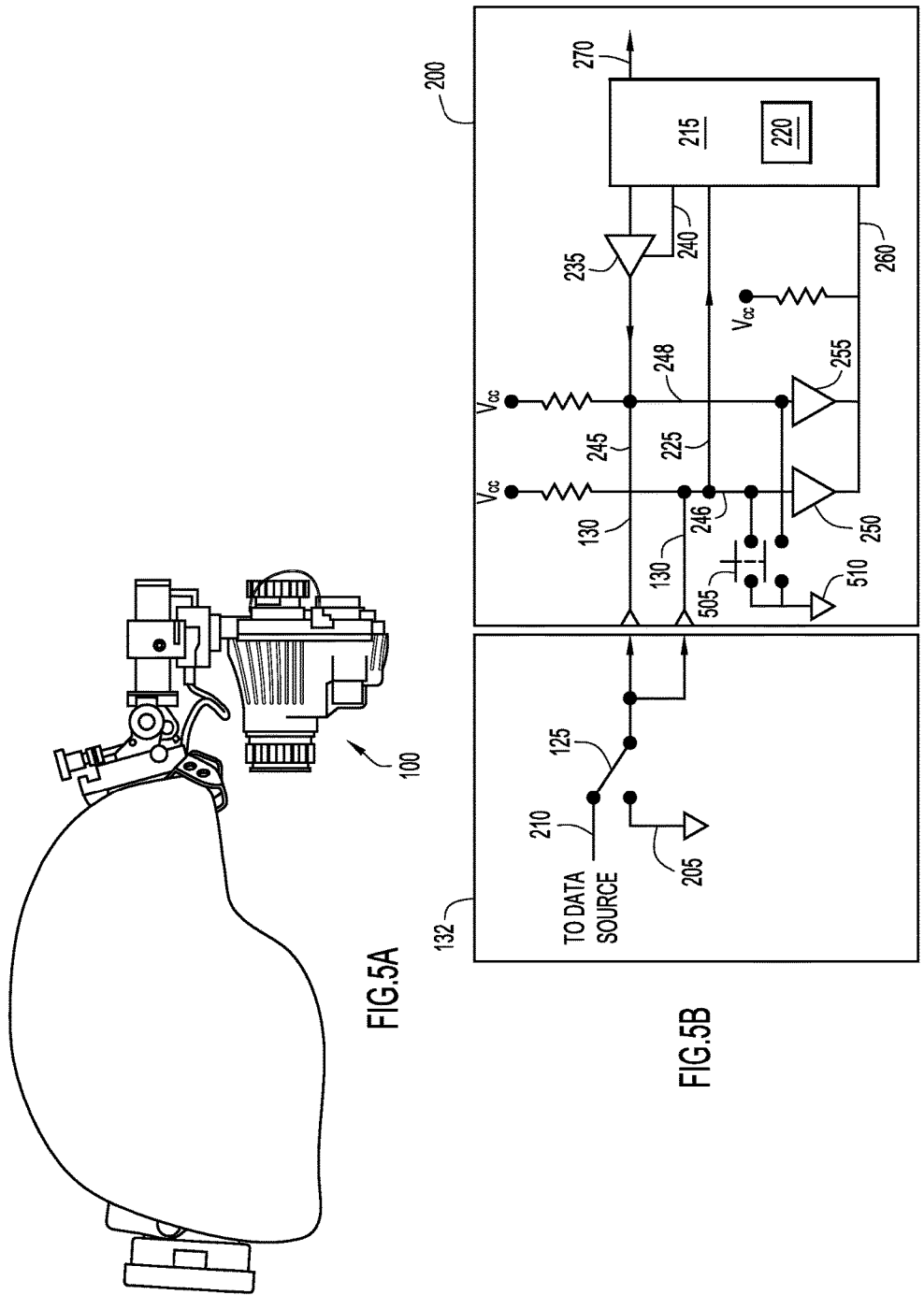
FIGS. 5a and 5b are illustrations of a second example near-to-eye display and a corresponding circuit diagram when the near-to-eye display is powered-up in an active position.

With reference now made to FIGS. 5a and 5b, depicted there is a fourth example night vision goggle 100 which includes push switch 505. Push switch 505 is configured to signal microcontroller 215 to by-pass the predetermined time period even if the goggle is powered-up in the active position. Specifically, push switch 505 connects first stow signal 246 and second stow signal 248 to ground when pressed. Accordingly, stow input 260 will read logical low even though goggle 100 is in the active position and switch 125 is connected to data source 210. Accordingly, a user can power-up goggle 100 in the active position and still by-pass the predetermined period of time while pressing push switch 505.

Furthermore, while FIG. 5 illustrates switch 505 as a two-pole push switch, because open collectors 250 and 255 act as a wired AND, a single push switch that connects only one of the open collector inputs to ground would be sufficient to by-pass the predetermined time limit.

Though not pictured, in an alternative example to that of FIG. 5, push switch 505 may be connected to microcontroller 215 through means other than stow input 260 to prevent a user from inadvertently inactivating night vision goggle 100 during use. For example, microcontroller 215 may include an additional input which when activated would override the activation process transmit line 245, while not simultaneously sending a logical low to stow input 260.

Figure 6:
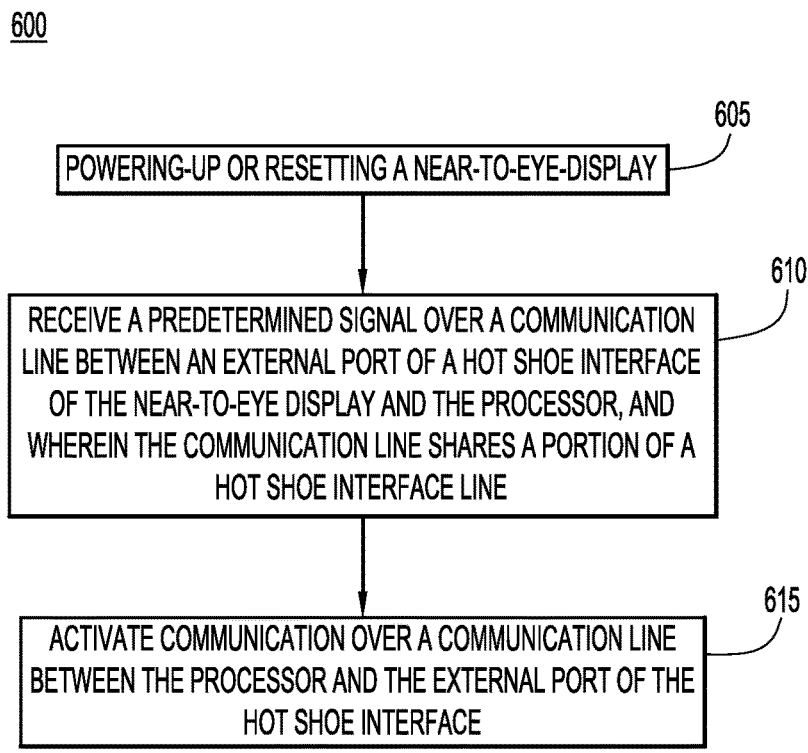
FIG. 6 is a flow chart illustrating a method of utilizing a hot shoe connection for communication with a near-to-eye display.

With reference now made to FIG. 6, depicted therein is flowchart 600 illustrating a method for providing a communication link through a hot shoe of a near-to-eye-display, such as a night vision goggle 100 of FIGS. 1-5. The process begins in step 605 in which the near-to-eye display is powered-up or reset.

In step 610, a predetermined signal is received over a communication line between an external port of a hot shoe interface of the near-to-eye display and a processor (for example a microcontroller), and wherein the communication line shares a portion of a hot shoe interface line. The near-to-eye display may wait a predetermined period of time during step 610. For example, waiting for the predetermined signal may comprise waiting for a signal as described above with reference to FIGS. 2-5.

In response to receiving the predetermined signal, communication is activated over a communication line in step 615. In order activate communication over the communication line, the process may further comprise the actions taken by microcontroller 215 described above with reference to FIGS. 2-5. For example, activating communication over the communication line may also include placing the near-to-eye display in a maintenance mode. Similarly, in order to activate communication of the communication line, a signal may be sent from microcontroller to a tri-statable buffer, thereby activating the line.

Furthermore, process 600 may include additional steps. For example, the communication of the communication line may be inactivated in response to the near-to-eye display transitioning from an active position to a stowed position, as described above with reference to FIG. 1-5. In order to determine when the near-to-eye display makes this transition, process may include receiving signals from one or more redundant and separate stow signal lines.

Figure 7A:
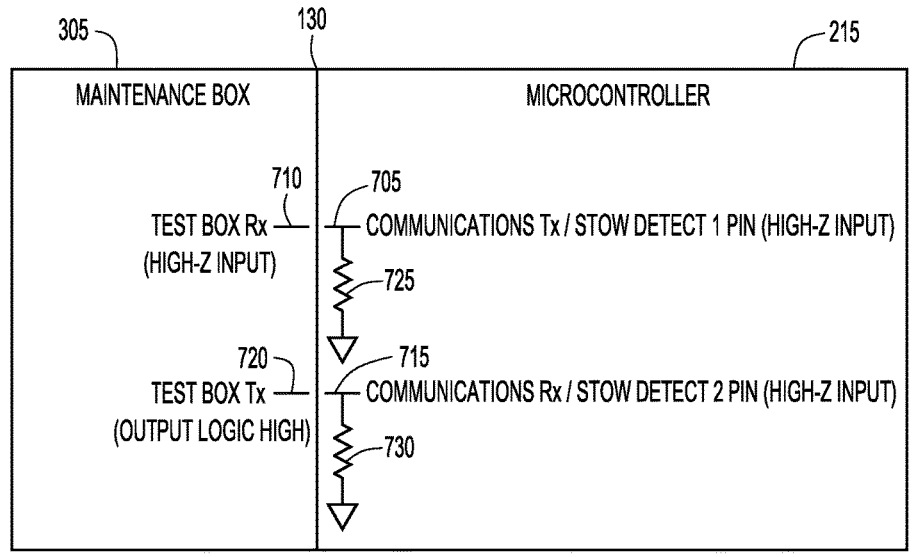
FIGS. 7a-h are a series of diagrams illustrating different possible microcontroller states for a communication line implemented in a near-to-eye display.

With reference now made to FIGS. 7a-h, depicted therein additional example circuit diagrams illustrating the state of the microcontroller pins when connected to a variety of devices through a hot shoe interface of a near-to-eye display device, such as a night vision goggle. For example, FIG. 7a depicts microcontroller 215 connected to maintenance box 305 through hot shoe interface 130. Specifically, first pin 705 of microcontroller 215 is connected to receive line 710 of maintenance box 305. Similarly, second pin 715 of microcontroller 215 is connected to transmit line 720 of maintenance box 305. Accordingly, first pin 705 may be configured to transmit signals to maintenance box 305 as it is connected receive line 710 of maintenance box 305, while second pin 715 may be configured to receive signals from maintenance box 305 as it is connected to transmit line 720.

Upon power up, microcontroller 215 initially places first pin 705 and second pin 715 in a high impedance, logically low state. For example, as illustrated in FIG. 7a, first pin 705 and second pin 715 are both connected to pull-down resistors 725 and 730, respectively. Accordingly, if nothing is connected to first pin 705 and second pin 715, these pins will read a low value. Upon powering up, maintenance box 710 is configured to output a logical high value through transmit line 720. According to the example of FIG. 7a, when microcontroller 215 reads the logical high value output by transmit line 720 and received through second pin 715, microcontroller 215 determines that maintenance box 305 is connected to microcontroller 215 through hot shoe interface 130 of the near-to-eye display. Accordingly, the logical high value output from transmit line 720 serves as a predetermined signal, such as the predetermined signal discussed in reference to step 610 of FIG. 6.

Figure 7B:
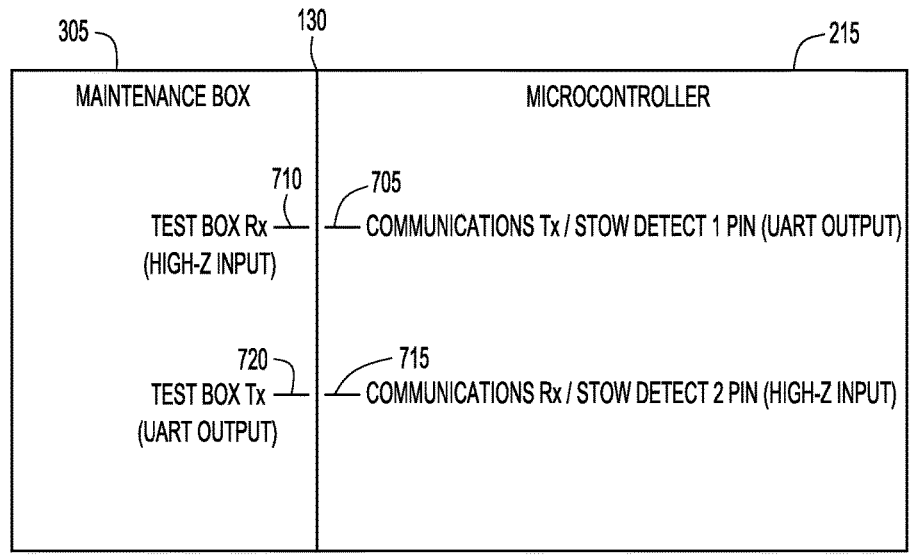

Upon reading the logical high value through second pin 715, the microcontroller changes modifies first pin 705 and second pin 715 to operate as illustrated in FIG. 7b. Specifically, microcontroller 215 controls first pin 705 to operate in a transmission mode to allow communication with maintenance box 305. According to the example of FIG. 7b, first pin 705 is controlled to operate as a Universal Asynchronous Receiver/Transmitter ("UART"). Second pin 715 continues to be configured to receive signals over transmit line 720 of maintenance box 305. Finally, once maintenance box 305 begins communicating with microcontroller 215, transmit line 720 acts as UART for maintenance box 305.

Figure 7C:
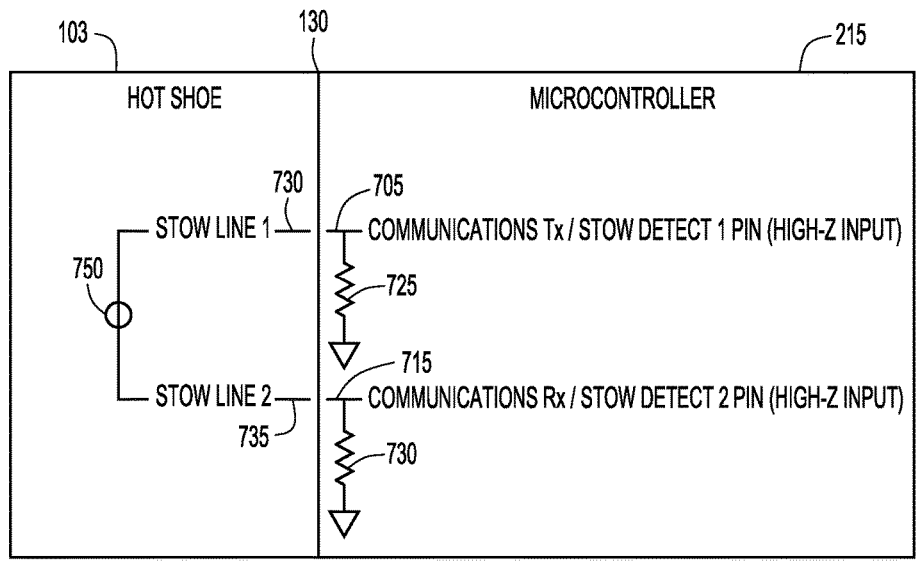
Figure 7D:
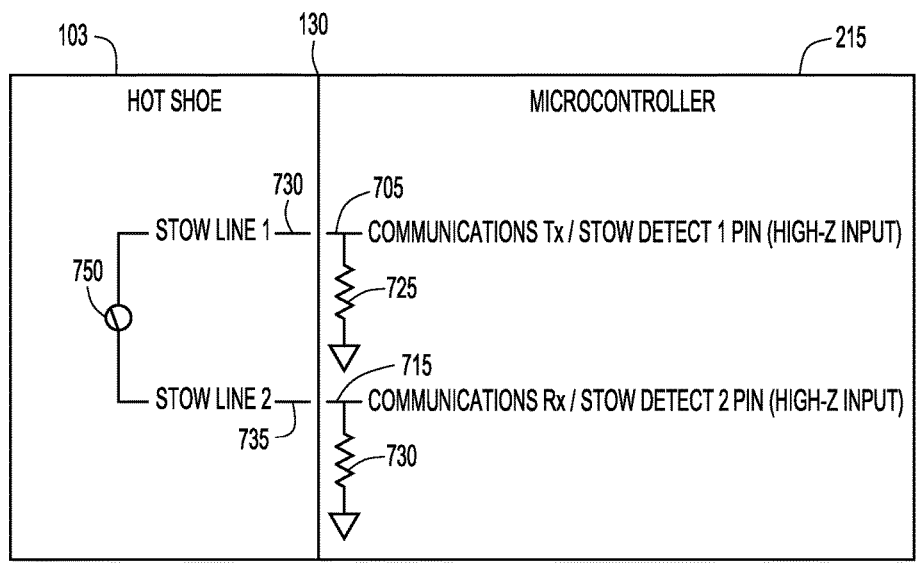

With reference now made to FIGS. 7c and 7d, depicted therein is a microcontroller 215 of a near eye display in which first pin 705 and second pin 715 of the microcontroller are connected to a mounting device 103, such as the mounting device depicted in FIGS. 1a and 1b. Included in mounting device 705 is a stow switch 750. Stow switch 750 is connected to mircrocontroller 215 through first stow line 730 and second stow line 715. Stow switch 750 is connected to first stow line 130 and second stow line 735 such that when the near-to-eye display is not stowed, e.g. in an active position, stow switch 750 is closed as illustrated in FIG. 7c. When stow switch 750 is closed, first stow line 730 and second stow line 735 are electrically connected. On the other hand, when near-to-eye is stowed, stow switch 750 is open as illustrated in FIG. 7d, breaking the electrical connection between first stow line 730 and second stow line 735.

As with the examples of FIGS. 7a and 7b, microcontroller 705 initially places first pin 705 and second pin 715 in a high impedance, logically low state. Also as with the examples of FIGS. 7a and 7b, microcontroller 215 is configured to detect the signal received over second pin 715. Accordingly, when stow switch 750 is closed as in FIG. 7c, the microcontroller will measure a logical low value at second pin 715 because there are no devices connected to second pin 725 which would drive the signal high. Because the predetermined signal that indicates that microcontroller 215 is connected to a maintenance box is a logical high value, microcontroller "knows" it is instead connected to mounting device 103 due to measuring a logical low value at second pin 715. Similarly, when stow switch 750 is in the open position as depicted in FIG. 7d, second pin 715 will read a logical low even though it is connected to an open line due to pull down resistor 730. Accordingly, even when stow switch 750 is in the open position, microcontroller 215 determines that it is connected to mounting device 103.

Figure 7E:
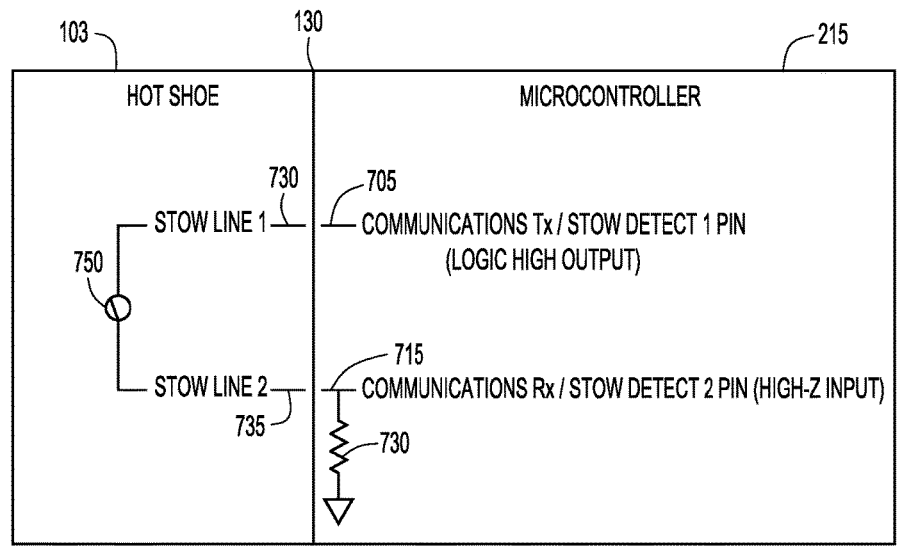

Subsequent to determining it is connected to mounting device 103, microcontroller 215 alters the configuration of first pin 705 to have a logical high output as illustrated in FIG. 7e. By altering the output of first pin 705, microcontroller 215 can measure the input of second pin 715 to determine if mounting device 103 is in the stowed or unstowed position. Specifically, if stow switch 750 is in the open position, second pin 715 will read a logical low value which indicates to microcontroller 215 that mounting device 103 is in the stowed position. On the other hand, if stow switch 750 is in the closed position, second pin 715 will read the output of first pin 705 as they are electrically connected through first stow line 730, stow switch 750, and second stow line 735.

Figure 7F:
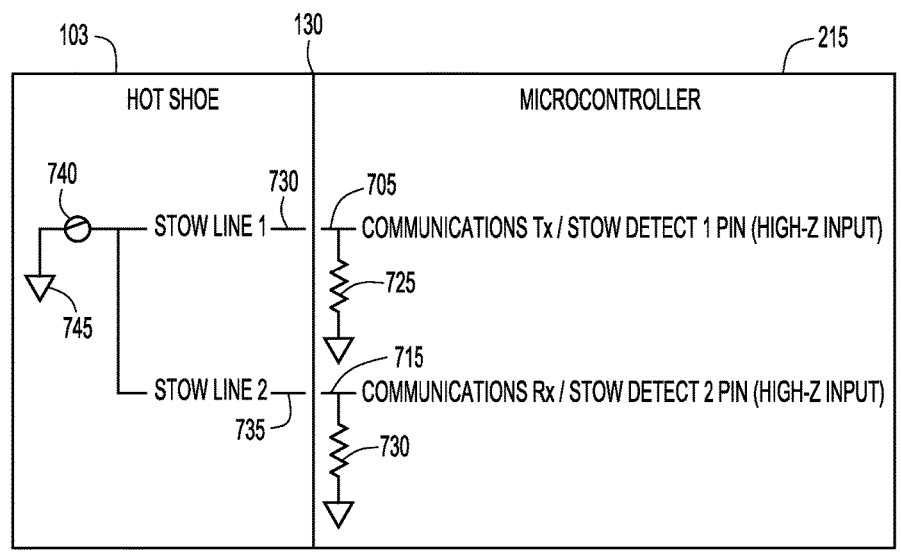
Figure 7G:
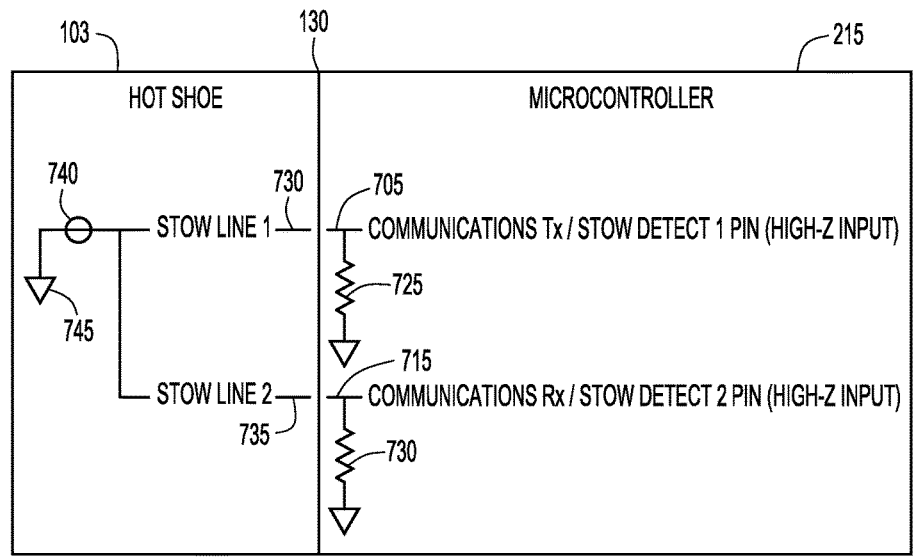
Figure 7H:
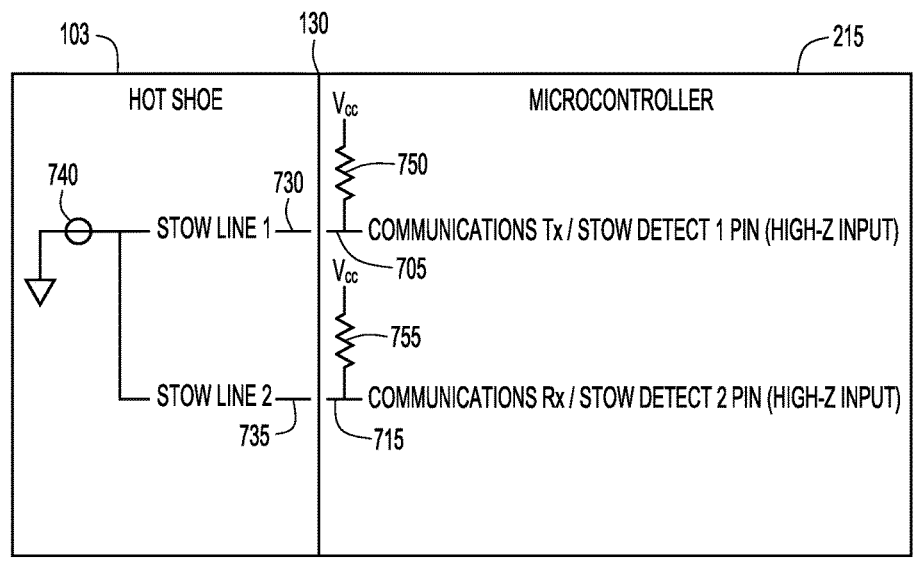

With reference now made to FIGS. 7*f-h*, depicted therein is microcontroller 215 which is connected to mounting device 103 through hot show interface 130. Stow switch 740 differs from stow switch 750 of FIGS. 7*c-d* in that it connects to ground instead of connecting across first stow line 730 and second stow line 735, stow switch 740 is open when the near-to-eye display is not stowed, as illustrated in FIG. 7*f*, and connects to ground when the near-to-eye display is in the stowed position, as illustrated in FIG. 7*g*. Accordingly, when microcontroller is configured to operate with a stow switch like stow switch 740, it will operate different than if it were configured to operate with stow switch 750 of FIGS. 7*c-e*, as will be discussed below with reference to FIG. 7*h*.

After an initial power-up or reset, microcontroller 215 places first pin 705 and second pin 715 in a high impedance, logically low state. As with the examples described above with reference to FIGS. 7*a-e*, microcontroller will measure the input to second pin 715 to determine if microcontroller 215 is connected to a maintenance box or mounting device 103. Because second pin 715 measures a logical low, microcontroller 215 determines that it is connected to mounting device 103.

Once it is determined that the near-to-eye display is connected to mounting device 103, microcontroller 215 reconfigures first pin 705 and second pin 715 as illustrated in FIG. 7*h*. Specifically, both first pin 705 and second pin 715 are placed in high impedance, a logically high state through pull-up resistors 750 and 755, respectively. When the near-to-eye display is in an unstowed position, stow switch 740 will be open and both of first pin 705 and second pin 715 will read logical high. Accordingly, microcontroller 215 could read either pin, and the high logical value would tell microcontroller 215 that it is in the unstowed position. On the other hand, when the near-to-eye display is in the stowed position, stow switch 740 will be in the closed position, connected both first pin 705 and second pin 715 to ground 740. Accordingly microcontroller could read the logical low value at either of first pin 705 or second pin 715, thereby telling microcontroller it is in the unstowed position.

The above description is intended by way of example only.

What is claimed is:

1. An apparatus comprising:
    a near-to-eye display;
    a microcontroller;
    a hot shoe interface with an external port configured to communicate with an external mounting device for the near-to-eye-display;
    a hot shoe interface line between the external port and the microcontroller; and
    a communication line between the external port and the microcontroller which is configured to share at least a portion of the hot shoe interface line and is configured to transmit and receive external communications through the external port,
    wherein the microcontroller is configured to activate and deactivate transmission over the communication line in response to predetermined signals received over the communication line,
    wherein the hot shoe interface line comprises first and second redundant stow signal lines for the near-to-eye display device;
    wherein the communication line comprises a transmit line and a receive line;
    wherein the transmit line-shares at least a portion of the first redundant stow signal line; and
    wherein the receive line shares at least a portion of the second redundant stow signal line.

2. The apparatus of claim 1, wherein the first and second redundant stow lines are physically coupled to pins of the microcontroller.

3. The apparatus of claim 1, wherein the microcontroller is further configured to place the near-to-eye display device in a maintenance mode.

4. The apparatus of claim 1, wherein the microcontroller is further configured to receive a video signal over the communication line and display the video signal on the near-to-the-eye display.

5. The apparatus of claim 1, wherein the microcontroller is further configured receive a software update via the communication line.

6. The apparatus of claim 1,
    wherein the microcontroller is configured to activate and deactivate transmission over the communication line in response to the predetermined signals being received over the communication line within a first predetermined period of time from the external mounting device transitioning from one of an active orientation or a stowed orientation to the other.

7. The apparatus of claim 6, wherein the microcontroller is further configured to activate or deactivate transmission over the communication line within a second predetermined period of time from the near-to-eye display being powered-on.

8. The apparatus of claim 7, further comprising a by-pass switch configured to cause the microcontroller to by-pass the first predetermined period of time and/or the second predetermined period of time in response to the switch being activated.

9. The apparatus of claim 7, wherein the microcontroller is configured to deactivate transmission over the communication line when a stow signal is received over the stow line within a third predetermined period of time that is shorter in duration than the second predetermined period of time.

10. The apparatus of claim 1, further comprising:
    a switch configured to selectively connect the hot shoe interface to ground, wherein transitioning the external mounting device of the near-to-eye display from one of an active orientation or a stowed orientation to the other activates the switch; and
    wherein the microcontroller is configured to activate and deactivate transmission over the communication line in response to activation of the switch.

11. The apparatus of claim 10, wherein the microcontroller is configured to activate transmission over communication line when the switch is in an open state.

12. The apparatus of claim 1, wherein the external mounting device is a helmet mount.

13. The apparatus of claim 1, wherein the near-to-eye display comprises at least one of a night vision goggle, a thermal imager or an augmented reality goggle.

14. The apparatus of claim 1, further comprising a tri-statable buffer configured to be controlled by the microcontroller to activate and deactivate transmission over the communication line.

15. The apparatus of claim 1, wherein the microcontroller is further configured to activate or deactivate transmission over the communication line within a predetermined period of time from at least one of the near-to-eye display being powered-on or the mounting device transitioning from one of an active orientation or a stowed orientation to the other.

16. The apparatus of claim 15, further comprising a by-pass switch configured to cause the microcontroller to by-pass the predetermined period of time in response to the switch being activated.

17. A method comprising:
 powering-up or resetting a near-to-eye-display;
 receiving, via a stow line between an external port of a hot shoe interface of the near-to-eye display and a microcontroller of the near-to-eye display, an indication that a mounting device of the near-to-eye display has transitioned from one of an active orientation or a stowed orientation to the other;
 receiving, via a communication line between the external port of the hot shoe interface of the near-to-eye display and the microcontroller of the near-to-eye display, a first predetermined signal within a predetermined period of time from the mounting device transitioning from the one of the active orientation or the stowed orientation to the other;
 activating, via the microcontroller and in response to receiving the first predetermined signal, transmission over the communication line between the microcontroller and the external port of the hot shoe interface;
 receiving, via the communication line between the external port of the hot shoe interface of the near-to-eye display and the microcontroller of the near-to-eye display, a second predetermined signal; and
 deactivating, via the microcontroller and in response to receiving the second predetermined, transmission over the communication line,
 wherein the hot shoe interface line comprises first and second redundant stow signal lines for the near-to-eye display device;
 wherein the communication line shares at least a portion of the hot shoe interface line and is configured to transmit and receive external communications through the external port and comprises a transmit line and a receive line;
 wherein the transmit line shares at least a portion of the first redundant stow signal line; and
 wherein the receive line shares at least a portion of the second redundant stow signal line.

18. The method of claim 17, further comprising placing the near-to-eye display in a maintenance mode.

* * * * *